United States Patent [19]

McMahan

[11] Patent Number: 4,481,633
[45] Date of Patent: Nov. 6, 1984

[54] WET-JACKET ARGON-ION LASER

[75] Inventor: William H. McMahan, Salt Lake City, Utah

[73] Assignee: Laser Corporation, Salt Lake City, Utah

[21] Appl. No.: 339,691

[22] Filed: Jan. 15, 1982

[51] Int. Cl.³ .............................................. H01S 3/03
[52] U.S. Cl. ..................................... 372/62; 372/34; 372/61; 372/64
[58] Field of Search ...................... 372/62, 61, 34, 35, 372/63, 64

[56] References Cited

U.S. PATENT DOCUMENTS

| | | | |
|---|---|---|---|
| 3,518,569 | 6/1970 | Otto et al. | 372/35 |
| 3,555,449 | 1/1971 | Osial et al. | 378/35 |
| 3,665,337 | 5/1972 | Koechner | 378/35 |
| 3,670,262 | 6/1972 | Hallock et al. | 372/62 |
| 3,755,756 | 8/1973 | Silfvast | 378/62 |
| 3,763,442 | 10/1973 | McMahan | 372/61 |
| 4,207,541 | 6/1980 | Karger et al. | 378/35 |
| 4,380,077 | 4/1983 | McMahan | 378/61 |
| 4,385,390 | 5/1983 | McMahan | 378/61 |

FOREIGN PATENT DOCUMENTS 0108787 8/1980 Japan ..................................... 372/62

OTHER PUBLICATIONS

Donin et al., "High-power Ar ion lasers with an improved service life", *Sov. Jou. Quant Elect.* 9 (2), Feb. 1979, pp. 210-212.

Kobayashi, "Dare Gas ion laser tube" (as cited above).

*Primary Examiner*—William L. Sikes
*Assistant Examiner*—Léon Scott, Jr.
*Attorney, Agent, or Firm*—B. B. Olive

[57] ABSTRACT

A segmented ceramic tube for an argon-ion laser is fluid cooled and constructed to avoid shunting of current through the coolant.

7 Claims, 6 Drawing Figures

WET-JACKET ARGON-ION LASER

DESCRIPTION

1. Technical Field

The invention relates to an argon-ion laser having a ceramic bore laser tube with its exterior in direct contact with the cooling medium, typically water, and relates to copending application Ser. No. 232,543, and now U.S. Pat. No. 4,380,077 filed Feb. 9, 1981, entitled "Segmented Ceramic Bore Laser".

2. Background Art

A wet-jacket tube has been known in prior art as a tube in which a single piece ceramic tube is in direct contact with a cooling fluid.

A segmented ceramic bore tube has not been utilized despite its obvious advantages because the metalized joints of the bore which normally contact the plasma would be exposed to and in contact with a conductive cooling medium such as water. This situation would affect the operation of the tube by shunting current through the coolant. The degree of shunting would depend upon the conductivity of the water. The present invention thus has as its principal objective that of providing an argon-ion laser with a segmented ceramic bore tube arranged so as to avoid the mentioned shunting problem.

DISCLOSURE OF THE INVENTION

An argon-ion laser according to the invention incorporates a plurality of brazed ceramic segments which can be cooled directly by a conductive fluid such as water. The invention overcomes the shunting problem mentioned above by preventing ionization around the metalized joints. This is achieved by confining or sealing off the plasma in the bore region.

BEST MODE FOR CARRYING OUT THE INVENTION

An argon-ion laser of the type best suited to the invention is exemplified by the Model 60B argon-ion laser manufactured by the American Laser Corporation of Salt Lake City, Utah. This type of argon-ion laser is filled with argon gas at approximately 1 Torr and is further characterized by having a dispenser cathode, a conduction cooled anode, and suitable means for optical coupling to and from the tube.

Figure 1:
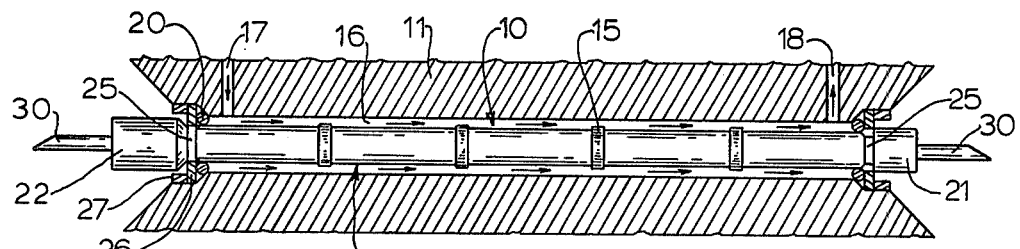
FIG. 1 is a schematic diagram illustrating a segmented ceramic argon-ion laser tube mounted within an enclosing water boundary and constructed according to the invention.

With reference to FIG. 1, there is shown a ceramic segmented argon-ion laser tube 10 mounted within an enclosing structure or water boundary 11 which may be the inside diameter of a solenoid assembly or other enclosing jacket. For example, the enclosing boundary 11 may represent the solenoid bobbin so that the solenoid and tube 11 are both cooled by the common flow of cooling fluid between them.

The laser tube 10 is shown constructed of five ceramic segments 14 brazed together at each joint with Kovar rings 15. An inlet port 17 and outlet port 18 are formed in the enclosing boundary 11 to permit flow of a heat conductive coolant 16, preferably tap water, between the segmented laser tube 10 and the enclosing boundary 11. Coolant 16 thus removes heat generated within the bore of the laser tube 10. The spacing "S" between the interior surface of the water boundary 11 and the exterior surface of the laser tube 10 is preferably made small, e.g., on the order of 0.100 inch, to enable a very efficient magnetic design to be achieved when the inside diameter of boundary 11 is established by a solenoid or solenoid bobbin as previously referred to.

O-rings 20 are used to seal off the coolant 16 from the shrouds of the anode 21 and cathode 22. Insulative bands 25 are used to maintain cathode and anode standoff from the boundary 11 and the cooling fluid-laser tube assembly. That is, where the solenoid, e.g., the solenoid bobbin, is being used as the boundary 11, the cathode and anode assemblies are both insulated relative to the laser tube and solenoid assembly. O-rings 20 are held in place by insulative rings 26 and insulative retainers 27. Glass stubs 30 provide optical transmission means.

Figure 2:
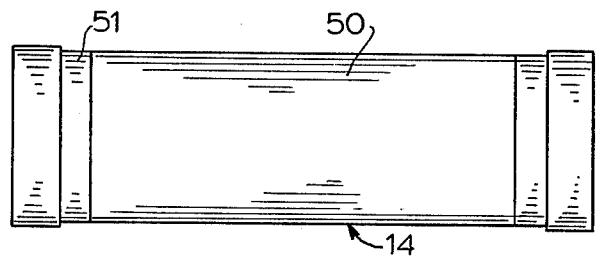
FIG. 2 is a side view of a ceramic segment employed in the invention construction.
Figure 4:
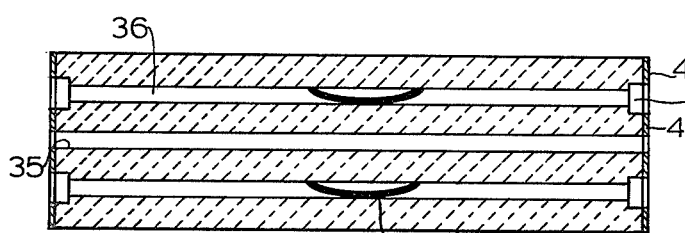
FIG. 4 is a section view of the ceramic segment taken along line 4—4 of FIG. 3.
Figure 3:
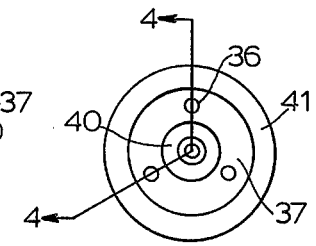
FIG. 3 is an end view of the ceramic segment shown in FIG. 2.
Figure 6:
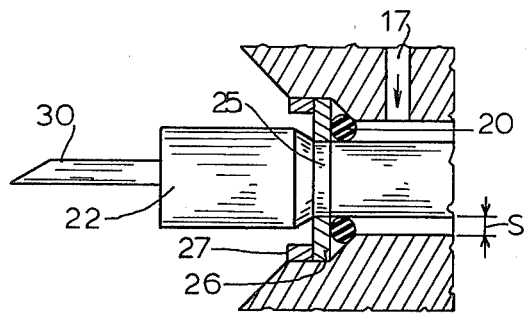
FIG. 6 is an enlarged fragmentary view of the cathode end of the FIG. 1 assembly.
Figure 5:
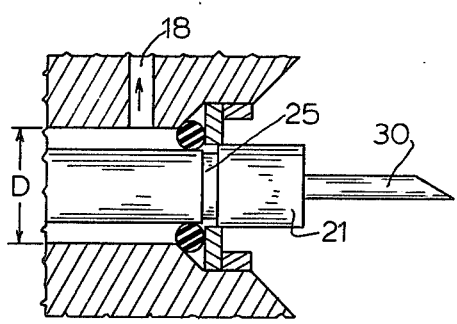
FIG. 5 is an enlarged fragmentary view of the anode end of the FIG. 1 assembly.

FIGS. 2–4 illustrate the ceramic segment construction in detail and how the hermetic seals are isolated from the plasma. Each segment 14 is fabricated from beryllia (BeO) or alumina ($Al_2O_3$) material. A very straight laser bore 35 extends the full length of the segment 14 and is concentric with the outside diameter of the segment. A plurality of gas return holes 36, typically three in number, extend for substantially the entire length of the segment 14 and end in a groove 37 on either end of the segment. Groove 37 serves as a means for communicating the ends of the gas return holes 37 between adjacent segments even in the event that the rotational alignment of the holes 36 is not the same in adjacent segments. The ends of each segment 14 are metalized so as to provide respective inner 40 and outer 41 annular metalized surfaces or rings. The outer rings 41 provide the hermetic seal between segments and the inner rings 40 isolate the plasma or ionized gas from the non-ionized gas in the gas return holes 36. Short wires 45 are inserted in the gas return holes 36 to prevent ionization or bypass lighting when the laser is triggered or started. The outer surface of each segment 14 is preferably provided with a metalized coating 50 which is ground away at each end to form an exposed insulating ceramic band 51.

Since the laser tube 10, together with the respective anode 21 and cathode 22 assemblies are normally assembled together before being installed in the manner illustrated in FIG. 1, it is desirable that the maximum diameter of such assembly be no greater than the inside diameter "D" of the boundary 11 so as to permit insertion into a solenoid or solenoid bobbin of minimum diameter. Thus, since the shroud of the anode 21 is typically smaller than the shroud of the cathode 22, it is desirable that the shroud for the anode 21 be no greater in diameter than the inside diameter of the coolant boundary 11 so as to permit insertion into a solenoid or solenoid bobbin of minimum diameter.

In summary, it can be seen that the argon-ion laser of the invention provides the desired segmented ceramic bore tube with direct cooling fluid contact but without the undesirable shunting problem experienced in prior art approaches to the same problem. Improved efficiency and extended life are thus achieved.

I claim:

1. In an argon-ion laser of the type having cathode, anode a laser tube and means for optical coupling to and from said tube, the improvement comprising:
    (a) a cylindrical-shaped laser tube comprising a plurality of ceramic segments, each segment having an internal central core forming a main discharge bore through the laser tube and other bores spaced radially outward therefrom forming gas bypass bores through the laser tube said ceramic segments being brazed and joined together to establish an electrically insulative non-ionized buffer region between said main discharge bore and the outer surface of said laser tube;
    (b) anode and cathode assemblies secured to respective opposite anode and cathode ends of said laser tube;
    (c) a fluid-containing structure surrounding and enclosing said laser tube between the anode and cathode ends thereof in radially closely-spaced relation to provide a coolant jacket sealed from said anode and cathode ends and having inlet and outlet means associated therewith for passing a coolant fluid through said jacket to surround and cool said laser tube; and
    (d) means effective to electrically insulate said anode and cathode assemblies relative to said fluid-containing structure and laser tube.

2. In an argon-ion laser as claimed in claim 1 wherein said fluid-containing structure comprises a solenoid assembly surrounding said laser tube.

3. In an argon-ion laser as claimed in claim 2 wherein said solenoid assembly includes a solenoid bobbin surrounding said laser tube and said bobbin includes said jacket thereby enabling said coolant fluid to cool both said bobbin and said laser tube.

4. In an argon-ion laser as claimed in claim 1 wherein said fluid-containing structure jacket receives said laser tube assembled with said anode and cathode assemblies and with minimum clearance between said laser tube and surrounding jacket.

5. In an argon-ion laser as claimed in claim 1 wherein said buffer region is established between metallized annular surfaces brazed together where said segments are joined.

6. In an argon-ion laser as claimed in claim 1 wherein said electrically insulating means comprise O-rings and O-ring retainers.

7. In an argon-ion laser of the type having cathode, anode a laser tube and means for optical coupling to and from said tube, the improvement comprising:
    (a) a cylindrical-shaped laser tube comprising a plurality of ceramic segments, each segment having an internal central bore forming a main discharge bore through the laser tube and other bores spaced radially outward therefrom forming gas bypass bores through the laser tube;
    (b) means joining said ceramic segments together in a manner effective to establish an electrically insulative non-ionized buffer region between said main discharge bore and the outer surface of said laser tube and wherein said buffer region is established between metallized annular surfaces brazed together where said segments are joined;
    (c) anode and cathode assemblies secured to respective opposite anode and cathode ends of said laser tube and including O-rings and O-ring retainers effective to electrically insulate said anode and cathode assemblies relative to said fluid-containing structure and laser tube; and
    (d) a fluiding-containing structure surrounding and enclosing said laser tube between the anode and cathode ends thereof in radially closely-spaced relation to provide a coolant jacket sealed from said anode and cathode ends and having inlet and outlet means associated therewith for passing a coolant fluid through said jacket to surround and cool said laser tube, said fluid containing structure comprising a solenoid assembly which assembly includes a solenoid bobbin surrounding said laser tube and said bobbin includes said jacket thereby enabling said coolant fluid to cool both said bobbin and said laser tube.

* * * * *